(12) United States Patent
Tanaka

(10) Patent No.: US 7,227,654 B1
(45) Date of Patent: Jun. 5, 2007

(54) METHOD AND APPARATUS FOR GROUP 3 FACSIMILE CAPABLE OF PROPERLY PERFORMING A COMMUNICATIONS OPERATION USING OPTIONAL FRAMES

(75) Inventor: Shigetaka Tanaka, Atsugi (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/317,069

(22) Filed: May 13, 1999

(30) Foreign Application Priority Data

May 13, 1998 (JP) .................................. 10-129825

(51) Int. Cl.
*G06F 15/00* (2006.01)
*G06K 15/00* (2006.01)

(52) U.S. Cl. ...................................... 358/1.15; 358/442

(58) Field of Classification Search ................ 358/1.15, 358/442, 444, 400, 468, 404, 434, 440; 379/100.01
See application file for complete search history.

(56) References Cited

U.S. PATENT DOCUMENTS

| | | | | |
|---|---|---|---|---|
| 5,293,253 A | * | 3/1994 | Kida et al. .................... | 358/440 |
| 5,442,686 A | * | 8/1995 | Wada et al. ............. | 379/88.13 |
| 5,671,270 A | * | 9/1997 | Yoshida .................. | 379/100.01 |
| 5,959,741 A | | 9/1999 | Yoshida et al. ............. | 358/440 |
| 6,104,504 A | * | 8/2000 | Imai et al. ................... | 358/407 |
| 6,137,597 A | * | 10/2000 | Kanaya ....................... | 358/402 |
| 6,384,927 B1 | * | 5/2002 | Mori ......................... | 358/1.15 |

FOREIGN PATENT DOCUMENTS

| | | |
|---|---|---|
| JP | 6-237359 | 8/1994 |
| JP | 6-339031 | 12/1994 |
| JP | 8-125821 | 5/1996 |
| JP | 8-289113 | 11/1996 |
| JP | 8-331295 | 12/1996 |
| JP | 9-200471 | 7/1997 |
| JP | 9-247469 | 9/1997 |
| JP | 9-270899 | 10/1997 |
| JP | 10-150543 | 6/1998 |
| JP | 10-336421 | 12/1998 |
| JP | 11-164045 | 6/1999 |

* cited by examiner

*Primary Examiner*—Gabriel Garcia
(74) *Attorney, Agent, or Firm*—Cooper & Dunham LLP

(57) ABSTRACT

A method of a facsimile apparatus includes the steps of providing the facsimile apparatus with a memory which prestores identification information for a plurality of different facsimile machines having common specifications of optional frames, receiving a call for a facsimile communications operation using an optional frame and then identification information from a calling facsimile machine, verifying the identification information sent from the calling facsimile machine with the identification information prestored in the memory, canceling performance of the facsimile communications operation using the optional frame when the identification information sent from the calling facsimile machine is different from the identification information prestored in the memory, and executing the facsimile communications operation using the optional frame when the identification information sent from the calling facsimile machine is identical to the identification information prestored in the memory.

13 Claims, 10 Drawing Sheets

Fig. 2

| IDENTIFICATION TABLE |
|---|
| IDENTIFICATION INFORMATION NO. 1 |
| IDENTIFICATION INFORMATION NO. 2 |
| IDENTIFICATION INFORMATION NO. 3 |
| IDENTIFICATION INFORMATION NO. 4 |
| ... |

| SUB-ADDRESS CONVERSION TABLE ||
|---|---|
| SUB-ADDRESS | REGISTERED TELEPHONE NO. |
| 10000001 | 0123-4567-8901 |
| 10000002 | 0234-5678-9012 |
| 10000003 | 03-3333-33399 |
| ... | ... |

2b

METHOD AND APPARATUS FOR GROUP 3 FACSIMILE CAPABLE OF PROPERLY PERFORMING A COMMUNICATIONS OPERATION USING OPTIONAL FRAMES

BACKGROUND

1. Field

The disclosed method and system relates to a facsimile apparatus. More particularly, the disclosed method and system relates to a facsimile apparatus which is capable of properly performing a facsimile communications operation using optional frames without causing a communications error.

2. Description of the Related Arts

There have been developed facsimile machines capable of performing a facsimile communications operation in accordance with the international Group-3 facsimile communications standard, the recommendation T.30 (hereinafter referred to as the T-30) issued by ITU-T (International Telecommunication Union; T sector). The T-30 has been updated from time to time with additional specifications and thus includes several optional frames such as SEP (selective polling), SUB (sub-address), PWD (password), and so on.

The frame PWD is defined in a selective polling mode as a signal for indicating that the following facsimile information field (FIF) represents a password for allowing entrance to a selective polling mode, which can be used for additional security to the facsimile communications procedure. The frame PWD is also defined as a signal for indicating that the following FIF represents a password for allowing transmission of facsimile information during the regular communications mode.

The frame SEP is defined in the selective polling mode as a signal for indicating that the following FIF represents a sub-address to be used in the selective polling mode, which can be used as an indication of an event that a specific document will be polled at the called facsimile machine.

The frame SUB is defined in the normal communications mode as a signal for indicating that the following FIF represents a sub-address assigned to a terminal machine within a domain where the called facsimile machine is located, which can be used as additional routing information in the facsimile communications procedure.

Such an addition of the optional frames to the Group-3 facsimile communications protocol particularly improves the polling mode operation in the facsimile communications procedure. For example, it becomes possible for a calling facsimile machine in the polling mode to easily select receivable image information files as well as to enhance the level of information security. Also, it becomes possible for a calling facsimile machine in the polling mode to designate a destination terminal to which the files are to be transferred. For example, when a calling facsimile machine is coupled to a local area network, it can use the optional frames to designate a destination terminal at which the files can be received.

However, the facsimile machines which use the above-mentioned optional frames have a problem. As described above, the recommendation T-30 defines the optional frames from the functional point of view. However, the T-30 does not define the way the optional frames are to be used. Accordingly, the manufacturers of such facsimile machines need to establish an agreement on the usage of the optional frames. This is a way to ensure the performance of the facsimile communications operation between the facsimile machines manufactured by different manufacturers without causing problems. However, some manufacturers do not necessarily participate in the agreement and, therefore, freely produce facsimile machines which may not conform to the common specification of optional frames. Accordingly, these non-conformable facsimile machines may cause a facsimile apparatus a problem in a communications operation.

SUMMARY

The present invention provides a method of a facsimile apparatus to perform the facsimile communications operation using the optional frames with other manufacture's facsimile machines without causing a communications error. In one embodiment, the facsimile apparatus includes the steps of providing, receiving, verifying, canceling, and executing.

The providing step provides the facsimile apparatus with a memory which prestores identification information for a plurality of different facsimile machines having common specifications of optional frames. The receiving step receives a call for a facsimile communications operation using an optional frame and then identification information from a calling facsimile machine. The verifying step verifies the identification information sent from the calling facsimile machine with the identification information prestored in the memory. The canceling step cancels performance of the facsimile communications operation using the optional frame when the identification information sent from the calling facsimile machine is different from the identification information prestored in the memory. The executing step executes the facsimile communications operation using the optional frame when the identification information sent from the calling facsimile machine is identical to the identification information prestored in the memory.

The identification information prestored in the memory may be subscriber identifications each contained in a frame TSI to be generated by each of the plurality of different facsimile machines. Further, the identification information received in the receiving step may be a subscriber identification contained in a frame TSI generated by the calling facsimile machine.

The optional frames may include SUB, SEP, and PWD in conformance with the recommendation T-30 of ITU-T.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 2 and 3 are examples of an identification table and a sub-address conversion table, respectively, of the facsimile apparatus of FIG. 1;

DETAILED DESCRIPTION

Figure 1:
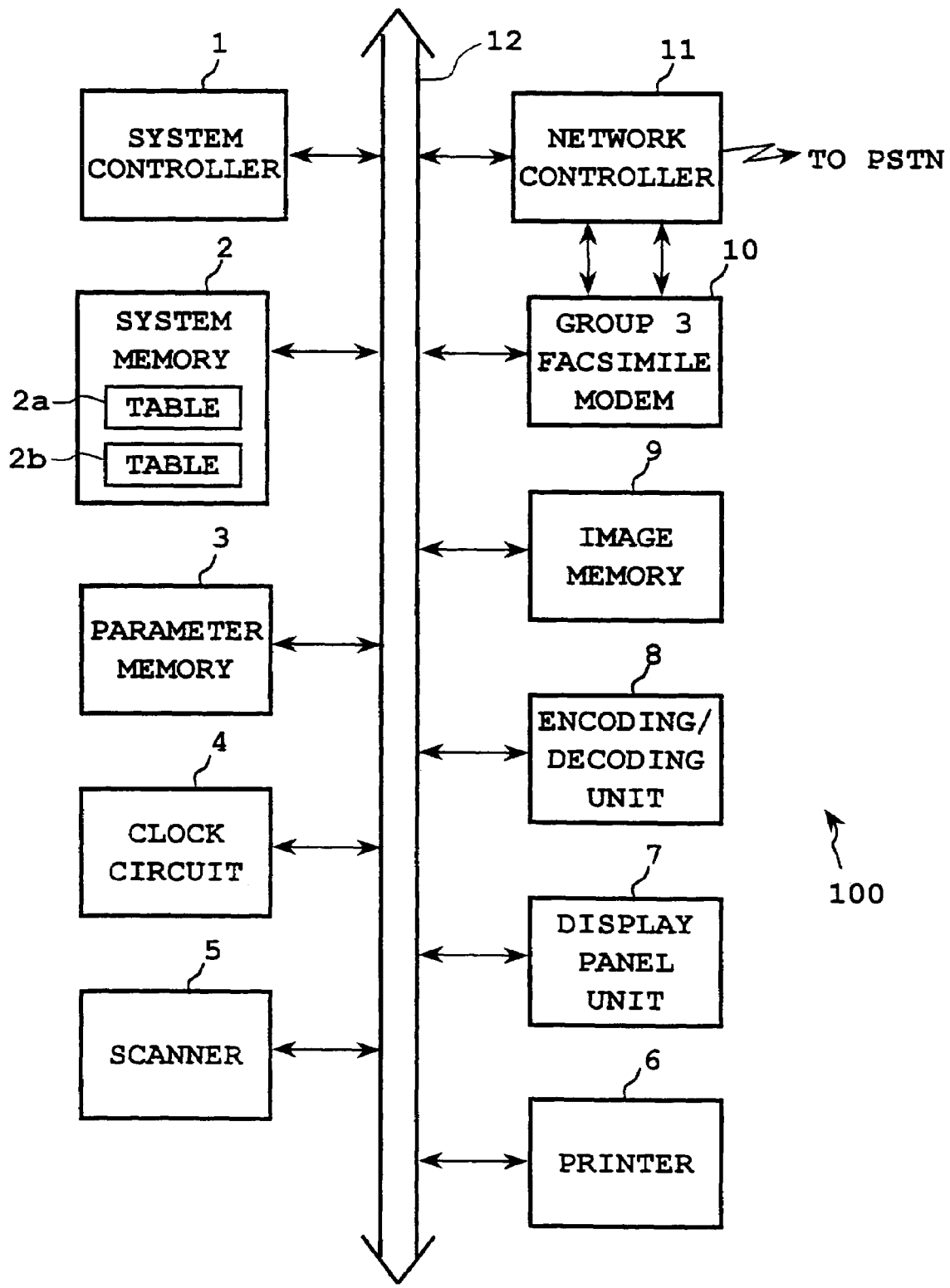
FIG. 1 is a block diagram of a facsimile apparatus according to an embodiment of the present invention.

In describing preferred embodiments illustrated in the drawings, specific terminology is employed for the sake of clarity. However, the invention is not intended to be limited to the specific terminology so selected and it is to be understood that each specific element includes all technical equivalents which operate in a similar manner.

Referring now to the drawings, wherein like reference numerals designate identical or corresponding parts throughout the several views, FIG. 1 illustrates a block diagram of a facsimile apparatus 100 according to an embodiment of the present invention. The facsimile apparatus 100 of FIG. 1 includes a system controller 1, a system memory 2, a parameter memory 3, a clock circuit 4, a scanner 5, a printer 6, a display panel unit 7, an encoding/decoding unit 8, an image memory 9, a Group-3 facsimile modem 10, a network controller 11, and an internal bus 12.

The system controller 1 controls the operations of the facsimile apparatus 100, including facsimile data transmission controls for transmitting and receiving image information and arbitrary data files. The system memory 2 stores control (or application) programs to be executed by the system controller 1 and corresponding data used when executing the control programs. The system memory 2 includes an identification table 1 and address conversion table 2 (both explained later) as well as a working memory area reserved for use by the system controller 1. The parameter memory 3 stores various kinds of parameters and information specific to the facsimile apparatus 100. The clock circuit 4 generates information of the present time.

The scanner 5 reads an image of a document at one of predetermined image reading resolutions. The printer 6 produces an image output at one of predetermined print resolutions. The display panel unit 7 includes various kinds of operational keys and indicators interfacing between an operator and the facsimile apparatus 100.

The encoding/decoding unit 8 encodes image information to be transmitted to other facsimile terminals so that the information is compressed. The encoding/decoding unit 8 also decodes the compressed image information, which are transmitted from other facsimile terminals, back into original image information. The transmission data memory 9 stores a plurality of files of data including image data that are compressed and binary data.

The Group 3 facsimile modem 10 is preferably a Group 3 facsimile modem that performs the functions of a modem for the Group 3 facsimile machine. The facsimile-modem 10 includes a low-speed modem function, such as a V.21 modem, for transmitting and receiving communication protocols and a high-speed modem function, such as V.17, V.34, V.29, V.27ter modems, for mainly transmitting and receiving image information. The network controller 11 has direct connections to the Group 3 facsimile modem 10. The network controller 11 includes an automatic transmitting and receiving function, and controls the connection of the facsimile apparatus 100 to various telephone networks such as a public switched telephone network (PSTN). The above-described units of the facsimile apparatus 100 are connected commonly to the internal bus 12, directly or indirectly, as shown in FIG. 1, so as to communicate with each other.

The facsimile apparatus 100 having the above-described various units therein is configured to handle the signals of the optional frames SEP, SUB, PWD. In order to ensure a proper operation, the facsimile apparatus 100 is capable of checking a calling facsimile machine using identification information upon receiving the above optional frames. The identification information are prestored in the identification table 2a included in the system memory 2. FIG. 2 shows an example of contents of the identification table 2a. The contents of the identification table 2a are a plurality of identification information such as ID 1, ID 2, ID 3, ID 4, and so on, which can be arbitrarily changed by an operator using the display panel unit 7.

The facsimile apparatus 100 is also configured to designate a destination terminal, to which an information file is transmitted, upon receiving the frame SUB. For this purpose, the facsimile apparatus 100 uses the address conversion table 2b. FIG. 3 shows an example of contents of the table 2b, in which a plurality of information sets of a SUB number 10000001, for example, and a registered telephone number 0123-4567-8901, for example, are stored. Through this address conversion table 2b, a SUB number 10000001, for example, is converted to a registered telephone number 0123-4567-8901, for example.

Figure 4:
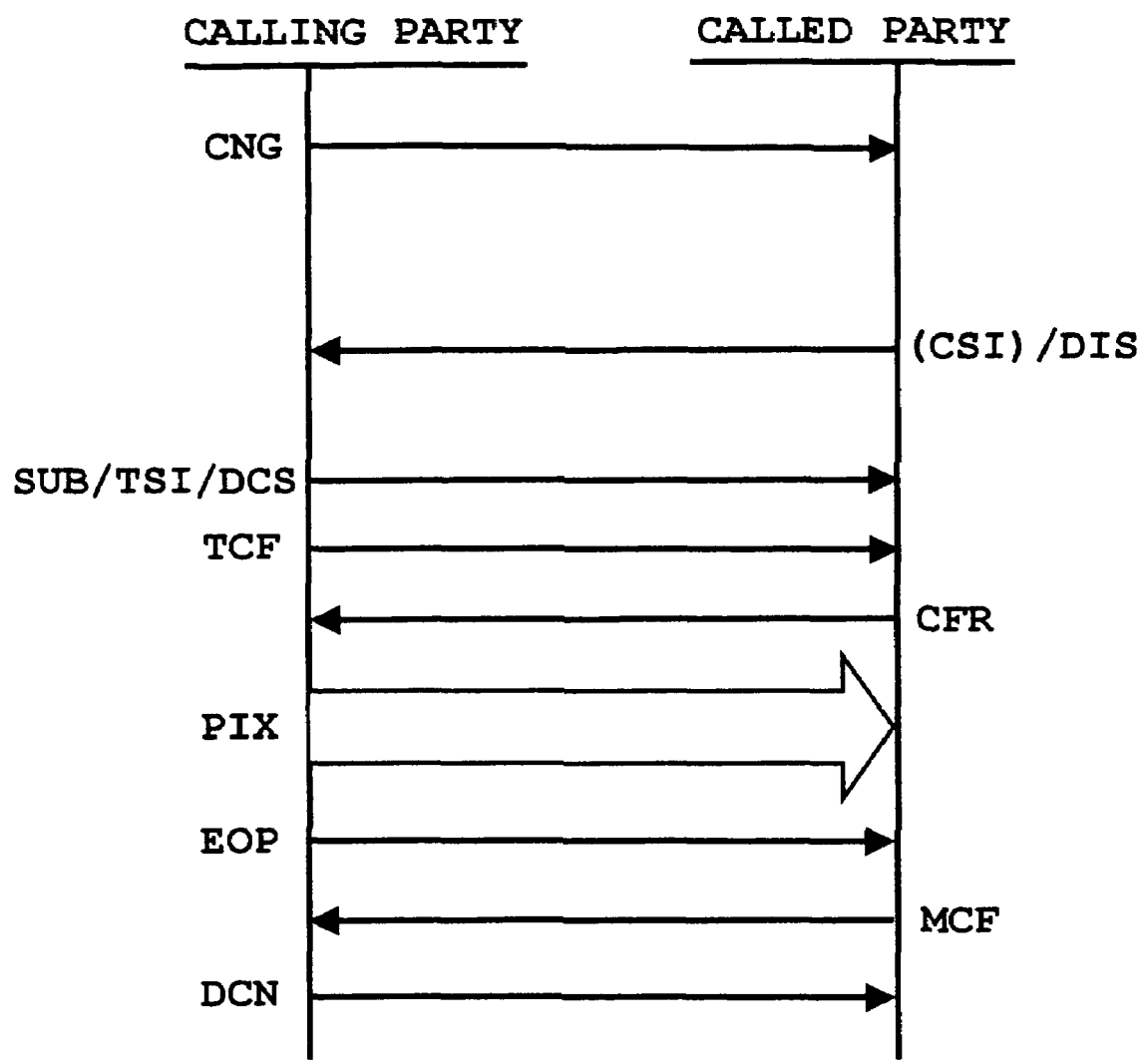
FIGS. 4 and 5 are illustrations for explaining facsimile communications procedures in a normal mode using an optional frame and in a selective polling mode using an optional frame, respectively.

Next, an exemplary Group-3 facsimile transmission procedure in the normal communications mode using the frame SUB is explained with reference to FIG. 4. FIG. 4 shows an exemplary Group-3 facsimile transmission procedure for sending a facsimile image from a facsimile terminal to the facsimile apparatus 100 in the normal communications mode using the frame SUB. In order to send facsimile image information, a facsimile terminal which is a calling party initiates a call to the facsimile apparatus 100 which is a called party. The PSTN establishes a closed line between the facsimile terminal and the facsimile apparatus 100 when the facsimile apparatus 100 accepts the call from the facsimile terminal. Then, the facsimile terminal sends a CNG (calling tone) signal to the facsimile apparatus 100 in order to declare that the calling facsimile terminal is a facsimile machine. The facsimile apparatus 100 sends back (CSI)/DIS (CSI stands for a called subscriber identification and DIS for a digital identification signal) to the facsimile terminal so as to inform the facsimile terminal of the communications capabilities of the called facsimile apparatus 100. In this operation, CSI may not necessarily be sent.

Upon receiving (CSI)/DIS, the facsimile terminal determines transmission functions to use, based on DIS signals from the facsimile apparatus 100, and informs the facsimile apparatus 100 of the determined functions by sending frames SUB/TSI/DCS (SUB stands for a sub-address, TSI for a transmitting subscriber identification, and DCS for a digital command signal) to the facsimile apparatus 100.

Then, the facsimile terminal sends a TCF (training check) signal to the facsimile apparatus 100 in order to perform a modem training at a modem speed which is used for the transmission of the facsimile image information. After a successful completion of the modem training, the facsimile apparatus 100 returns a CFR (confirmation to receive) signal to the facsimile terminal and becomes ready to receive facsimile image information. Upon receiving the CFR from the facsimile apparatus 100, the facsimile terminal starts to send a PIX (picture transmission) signal that includes facsimile image information to the facsimile apparatus 100 at the modem speed which is used in the training operation. Then, after completing the PIX signal, the facsimile terminal sends an EOP (end of procedure) for indicating the end of the transmission procedure to the facsimile apparatus 100.

The facsimile apparatus 100 stores the PIX signal in the image memory 9 and checks if the PIX signal includes facsimile image information in an appropriate condition. If the facsimile apparatus 100 determines that the PIX signal includes facsimile image information in an appropriate condition, the facsimile apparatus 100 sends an MCF (message confirmation) back to the facsimile terminal. Upon receiving the MCF signal, the facsimile terminal sends a DCN (disconnect) for commanding disconnection of the line to the facsimile apparatus 100. Then, both calling facsimile terminal and called facsimile apparatus 100 disconnect the line so as to end the communications session and to release the telephone line.

Then, the called facsimile apparatus 100 reads a telephone number of a destination terminal from the address conversion table 2*b* of FIG. 3 based on the sub-address information included in the received frame SUB. After that, the facsimile apparatus 100 sends a call to the destination terminal using the telephone number and transfers the PIX signal that includes the facsimile image information to the destination terminal.

In this way, the facsimile apparatus 100 performs the exemplary Group-3 facsimile transmission procedure in the normal communications mode using the frame-SUB.

The frame SUB may be used for another purpose. For example, SUB can contain information for specifying a password for a confidential message. In this case, for example, a message "a confidential message/please enter a password" is displayed on a display of the display panel unit 7. After that, the facsimile apparatus 100 may reproduce an image on a recording sheet with the printer 6 according to the stored facsimile image information only when the password specified by the frame SUB is entered through the display panel unit 7.

Figure 5:
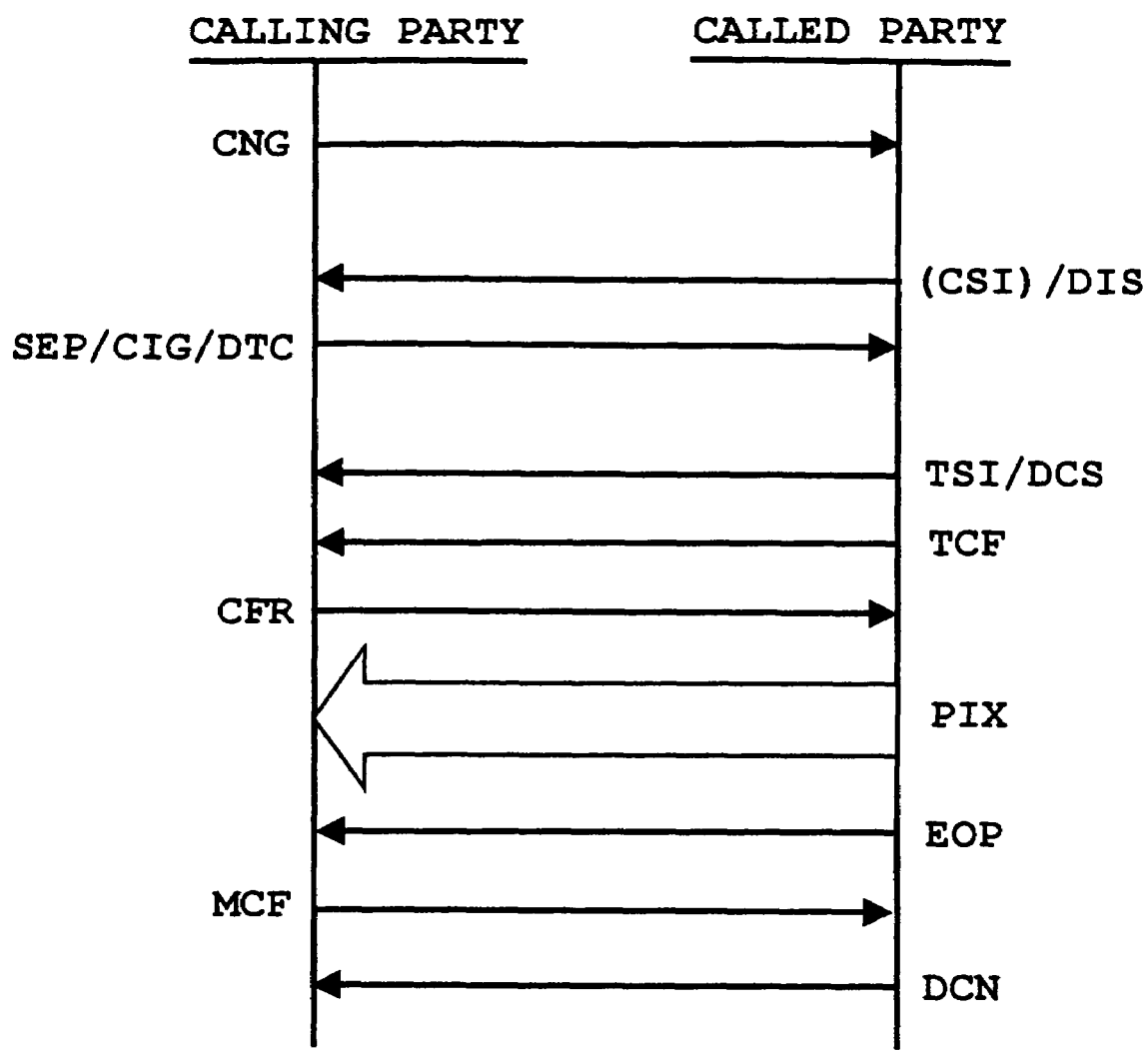

Next, an exemplary Group-3 facsimile transmission procedure in the polling mode using the frame SEP is explained with reference to FIG. 5. FIG. 5 shows an exemplary Group-3 facsimile transmission procedure in the polling mode using the frame SEP in which a facsimile terminal receives facsimile image information from the facsimile apparatus 100. In order to send facsimile image information, a facsimile terminal which is a calling party initiates a call to the facsimile apparatus 100 which is a called party. The PSTN establishes a closed line between the facsimile terminal and the facsimile apparatus 100 when the facsimile apparatus 100 accepts the call from the facsimile terminal. Then, the facsimile terminal sends the CNG signal to the facsimile apparatus 100 in order to declare that the calling facsimile terminal is a facsimile machine. The facsimile apparatus 100 sends back (CSI)/DIS to the facsimile terminal so as to inform the facsimile terminal of the communications capabilities of the called facsimile apparatus 100.

Upon receiving (CSI)/DIS, the calling facsimile terminal sends SEP/CIG/DTC (SEP stands for selective polling, CIG for calling subscriber identification) to the called facsimile apparatus 100 so as to select the polling mode. Upon receiving SEP/CIG/DTC, the called facsimile apparatus 100 enters the selective polling mode, determines transmission functions to use, and informs the calling facsimile terminal of the determined functions by sending frames TSI/DCS to the facsimile terminal.

Then, the facsimile apparatus 100 sends the TCF signal to the facsimile terminal in order to perform a modem training at a modem speed which is used for the transmission of the facsimile image information. After a successful completion of the modem training, the facsimile terminal returns the CFR signal to the facsimile apparatus 100 and becomes ready to receive facsimile image information. Upon receiving CFR from the facsimile terminal, the facsimile apparatus 100 starts to send the PIX signal, which is designated by the SEP signal, to the facsimile terminal at the modem speed which is used in the training operation. Then, after completing the PIX signal, the facsimile apparatus 100 sends the EOP for indicating the end of the transmission procedure to the facsimile terminal.

The facsimile terminal checks if the PIX signal includes facsimile image information in an appropriate condition. If the facsimile apparatus 100 determines that the PIX signal includes facsimile image information in an appropriate condition, the facsimile terminal sends MCF back to the facsimile apparatus 100. Upon receiving the MCF signal, the facsimile apparatus 100 sends DCN for commanding disconnection of the line to the facsimile terminal. Then, both calling facsimile terminal and called facsimile apparatus 100 disconnect the line so as to end the communications session and to release the telephone line.

In this way, the facsimile apparatus 100 performs the exemplary Group-3 facsimile transmission procedure in the selective polling mode using the frame SEP.

Figure 6:
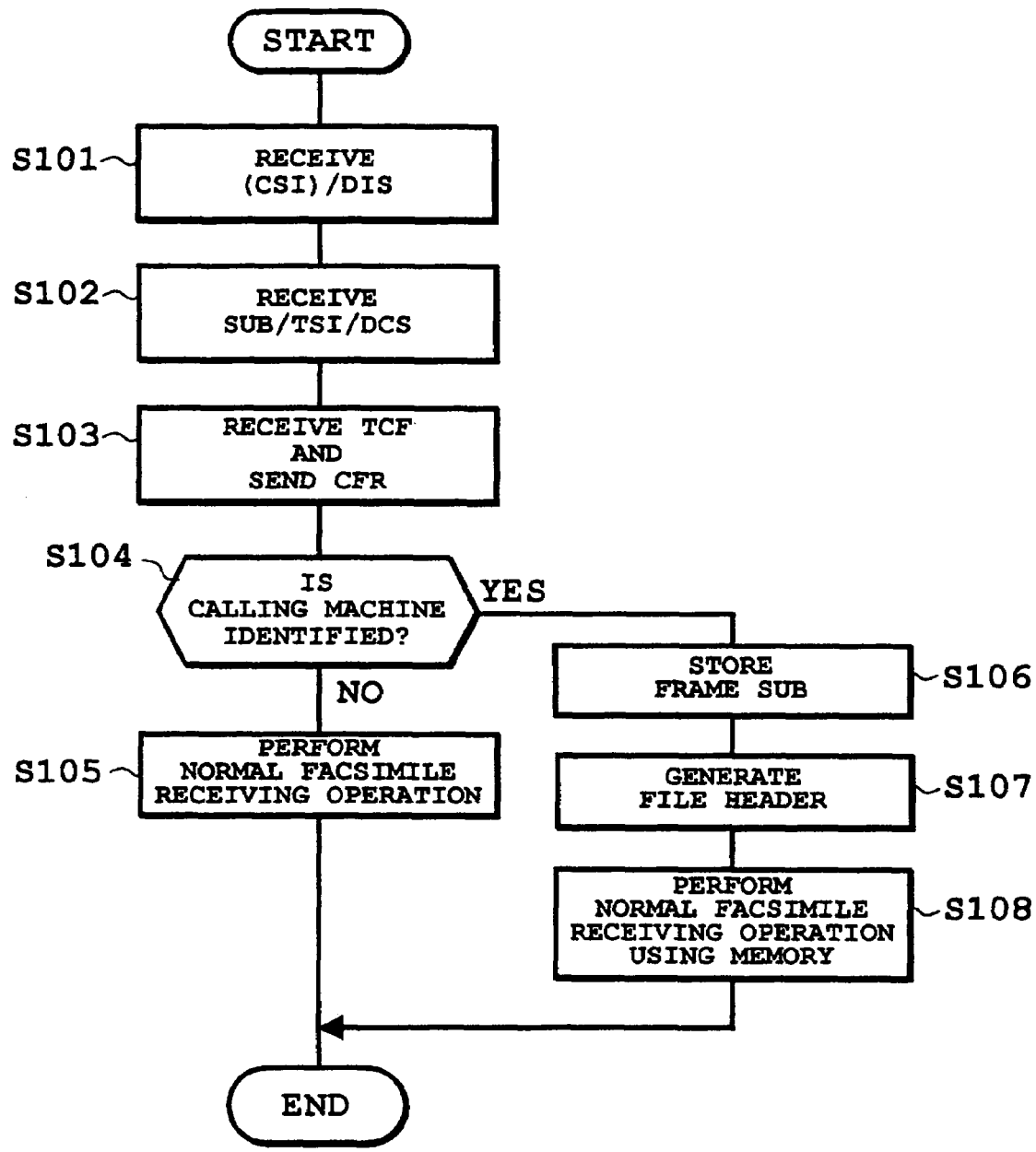
FIG. 6 is a flowchart for explaining an exemplary call receiving operation performed by the facsimile apparatus of FIG. 1, in which a calling facsimile machine requests using the optional frame SUB that the facsimile apparatus receives facsimile information as a transfer file and transfers such a transit file to a destination terminal.

Next, exemplary operations of the facsimile apparatus 100 in the normal facsimile information receiving mode are explained with reference to FIGS. 6 and 7. FIG. 6 illustrates a call receiving operation to be performed by the facsimile apparatus 100 when it receives a call from a calling facsimile terminal. When the facsimile apparatus 100 receives a call, it enters the operation of FIG. 6. In Step S101, the system controller 1 of the facsimile apparatus 100 sends (CSI)/DIS to the calling facsimile terminal. In Step S102, the facsimile apparatus 100 receives SUB/TSI/DCS. Then, in Step S103, the system controller 1 receives TCF, performs the modem training properly, and sends CFR. Thereby, the modem speed is determined.

The process of Step S104 checks if the identification information sent from the calling facsimile terminal is identical to the information registered in the identification table 2*a*. If the identification information is not identical and the check result of Step S104 is NO, the system controller 1 performs in Step S105 the normal facsimile receiving operation and then ends the procedure.

If the identification information is identical and the check result of Step S104 is YES, the system controller 1 stores the frame SUB into the system memory 2 in Step S106. Then, in Step S107, the system controller 1 generates a file header after setting up data bits corresponding to the frame SUB and generating link information for linking the file header to the frame SUB. After that, in Step S108, the system controller 1 performs an operation for receiving the PIX signal and stores the PIX signal into the image memory 9 as a transit file which is then transferred to a destination terminal. Then, the system controller 1 ends the procedure of the call receiving operation.

Figure 7:
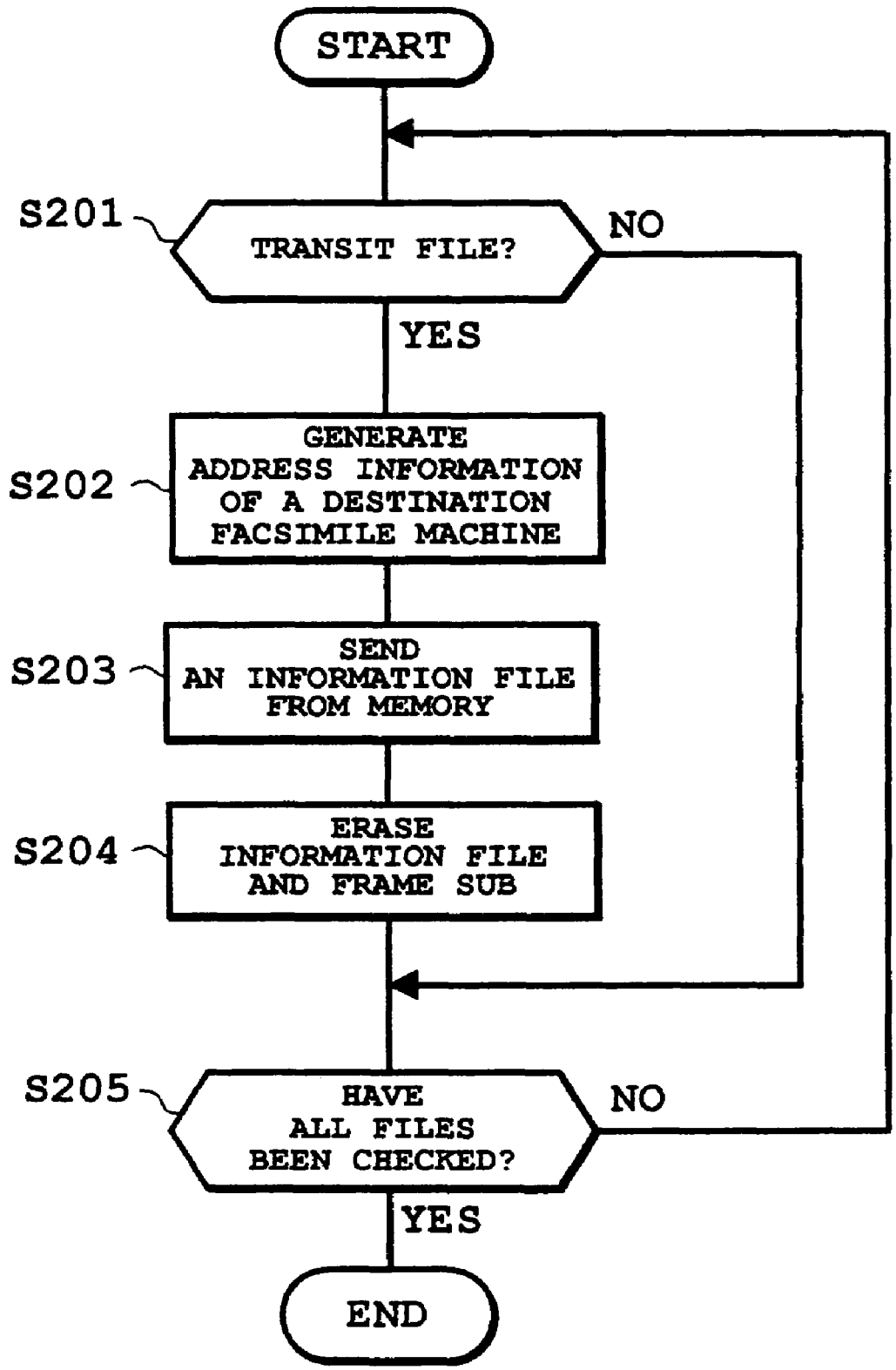
FIG. 7 is a flowchart for explaining an exemplary transit file checking operation which is performed after the call receiving operation of FIG. 6.

FIG. 7 illustrates a transit file check operation for the facsimile apparatus 100 to check the transit files stored in the image memory 9. The facsimile apparatus 100 checks the transit files from time to time. In Step S201, the system controller 1 checks if the image information stored in the image memory 9 is a transit file. If the image information is a transit file and the check result of Step S201 is YES, the process proceeds to Step S202 in which the system controller 1 reads the FIF contents of the frame SUB using the link information to the frame SUB and, using the address conversion table 2b, generates address information with respect to a destination terminal to which the facsimile image information stored as a transit file is transmitted.

Then, based on such generated information, the system controller 1 initiates in Step S203 a call to the destination terminal and transfers the transit file thereto. Upon completing the transfer, the system controller 1 erases the transit file from the image memory 9 and the frame SUB from the system memory 2, in Step S204. After that, in Step S205, the system controller 1 checks if all the facsimile image files stored in the image memory 9 have been checked. If all the facsimile image files have not been checked and the check result of Step S205 is NO, the process returns to Step S201 in which the system controller 1 checks whether the next facsimile image information is a transit file. If all the facsimile image files have been checked and the check result of Step S205 is YES, the system controller 1 ends the operation.

In this way, the facsimile apparatus 100 can perform the information transfer operation to a destination terminal in accordance with the FIF contents of the frame SUB when the identification information sent from the calling facsimile machine is identical to the information registered in the identification table 2a. Further, the facsimile apparatus 100 can perform the normal facsimile information receiving operation when the identification information sent from the calling facsimile machine is not identical to the information registered in the identification table 2a. Accordingly, the facsimile apparatus 100 will not perform the SUB-frame-based information transfer operation but perform the normal facsimile information receiving operation when receiving a call from an unknown facsimile terminal which may have different specifications with respect to the optional frames, including SUB, for example. Thereby, the facsimile apparatus 100 can avoid an occurrence of an erroneous communications operation with unknown terminals.

Figure 8:
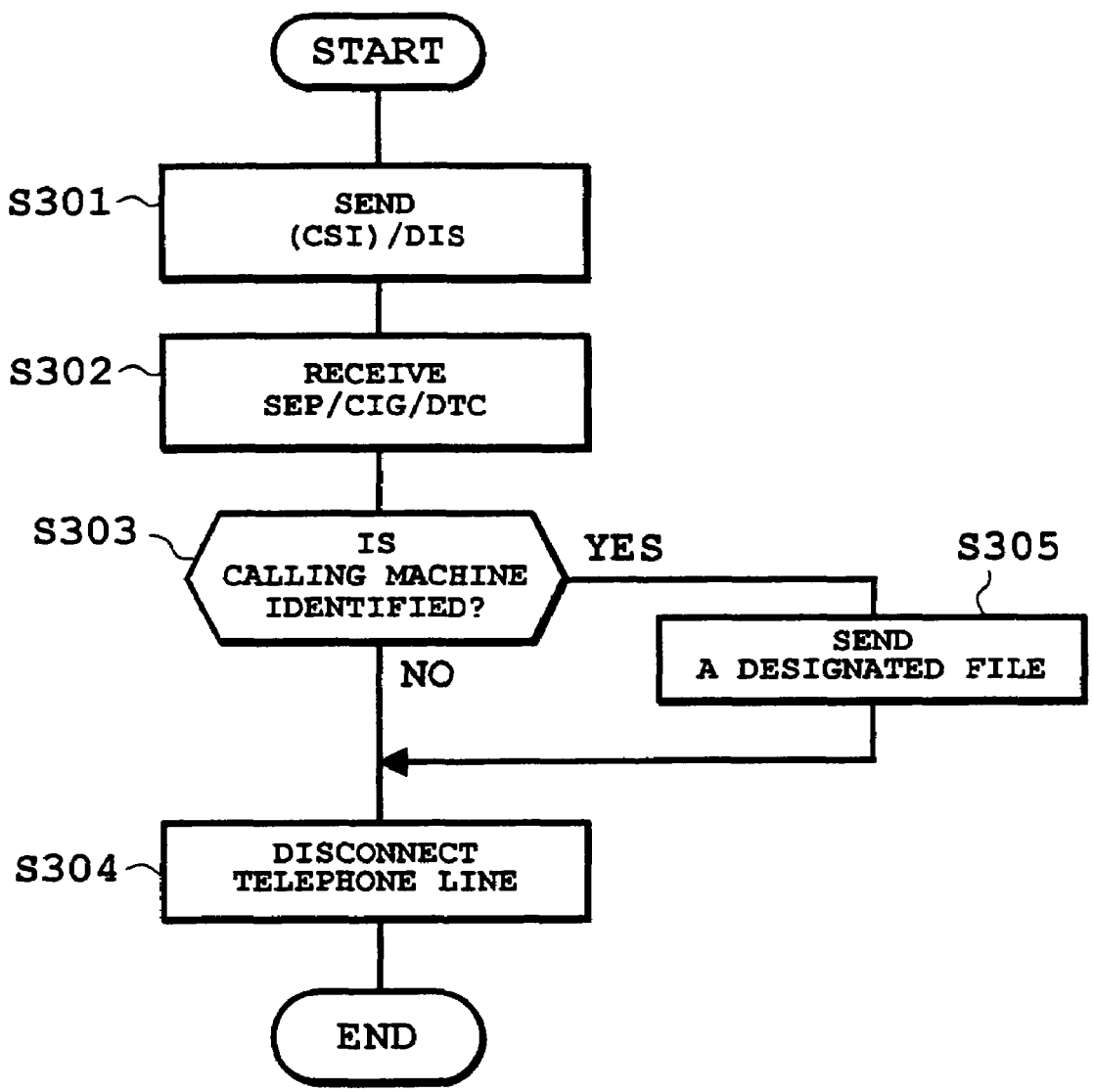
FIG. 8 is a flowchart for explaining an exemplary call receiving operation performed by the facsimile apparatus of FIG. 1, in which a calling facsimile machine requests using the optional frame SEP that the facsimile apparatus enters a selective polling mode and transfers a facsimile file to a destination terminal.

Next, an exemplary operation of the facsimile apparatus 100 in the selective polling mode is explained with reference to FIG. 8. FIG. 8 illustrates a call receiving operation to be performed by the facsimile apparatus 100 when it receives a call from a calling facsimile terminal in the selective polling mode. When the facsimile apparatus 100 receives a call, it enters the operation of FIG. 8. In Step S301, the system controller 1 of the facsimile apparatus 100 sends (CSI)/DIS to the calling facsimile terminal. In Step S302, the facsimile apparatus 100 receives SEP/CIG/DTC and enters the polling mode.

Then, the process of Step S303 checks if the identification information sent from the calling facsimile terminal is identical to the information registered in the identification table 2a. If the identification information is not identical and the check result of Step S303 is NO, the process proceeds to Step S304 in which the system controller 1 terminates the call receiving operation in the selective polling mode and disconnects the telephone line. Then, the facsimile apparatus 100 ends the operation. In this case, the facsimile apparatus 100 does not perform the SEP-frame-based polling information transmission operation.

If the identification information is identical and the check result of Step S303 is YES, the system controller 1 performs in Step S305 the SEP-frame-based polling information transmission operation. Thereby, the image information designated by the FIF contents of the frame SEP which is sent from the calling facsimile machine is transmitted to the calling facsimile machine in accordance with a predetermined transmission procedure. Then, the process proceeds to Step S304 to terminate the call receiving operation in the selective polling mode and to disconnect the telephone line. After that, the facsimile apparatus 100 ends the procedure of the call receiving operation in the selective polling mode.

In this way, the facsimile apparatus 100 can perform the polling information transmission operation in the selective polling mode in accordance with the FIF contents of the frame SUB when the identification information sent from the calling facsimile machine is identical to the information registered in the identification table 2a. Further, the facsimile apparatus 100 can terminate the polling information transmission operation in the selective polling mode when the identification information sent from the calling facsimile machine is not identical to the information registered in the identification table 2a. Accordingly, the facsimile apparatus 100 will not perform the SEP-frame-based polling information transmission operation but terminate the operation when receiving a call from an unknown facsimile terminal which may have different specifications with respect to the optional frames, including SEP, for example. Thereby, the facsimile apparatus 100 can avoid an occurrence of an erroneous communications operation with unknown terminals.

Figure 9:
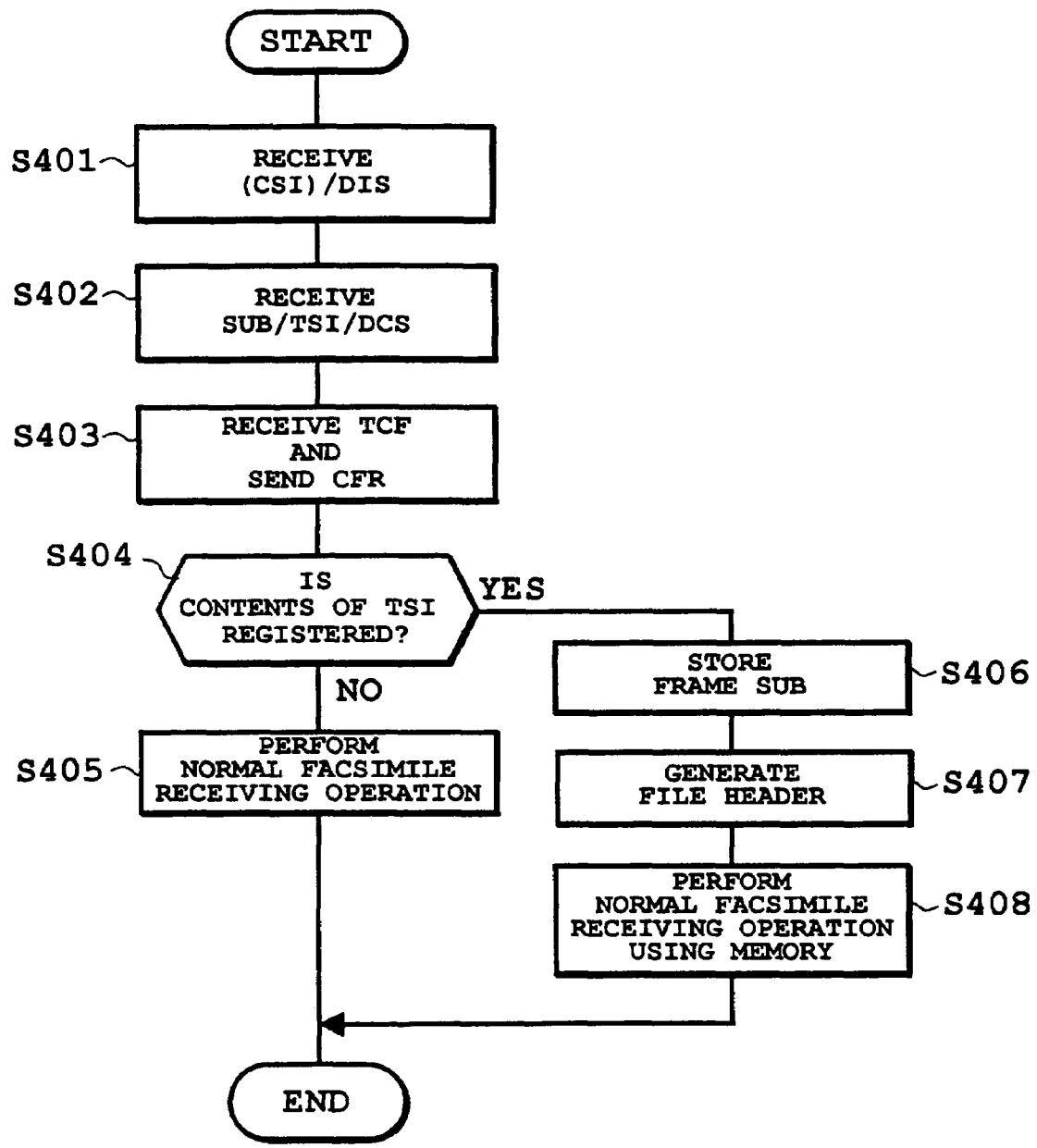
FIG. 9 is a flowchart for explaining an exemplary call receiving operation performed by the facsimile apparatus of FIG. 1, in which the FIF contents of TSI sent immediately after SUB is used as identification information of a calling facsimile machine.

Next, an exemplary operation of the facsimile apparatus 100 in the normal facsimile information receiving mode is explained with reference to FIG. 9. FIG. 9 illustrates a call receiving operation to be performed in the normal facsimile information receiving mode by the facsimile apparatus 100 when it receives a call from a calling facsimile terminal. This operation of FIG. 9 is similar to that of FIG. 6, except for the process of Step S404. In this operation of FIG. 9, the FIF contents of the standard TSI signal immediately after the SUB signal from the calling facsimile machine is used as the identification information of the calling facsimile machine. For this purpose, the identification table 2a prestores the FIF contents of the TSI signals to be generated by the facsimile machines which have the common specifications of the optional SUB frame.

When the facsimile apparatus 100 receives a call, it enters the operation of FIG. 9. In Step S401, the system controller 1 of the facsimile apparatus 100 sends (CSI)/DIS to the calling facsimile terminal. In Step S402, the facsimile apparatus 100 receives SUB/TSI/DCS. Then, in Step S403, the system controller 1 receives TCF, performs the modem training properly, and sends CFR. Thereby, the modem speed is determined.

The process of Step S404 checks if the identification information contained in the standard frame TSI sent from the calling facsimile terminal is identical to the information registered in the identification table 2a. If the identification information is not identical and the check result of Step S404 is NO, the system controller 1 performs in Step S405 the normal facsimile receiving operation and then ends the procedure.

If the identification information is identical and the check result of Step S404 is YES, the system controller 1 stores the frame SUB into the system memory 2 in Step S406. Then, in Step S407, the system controller 1 generates a file header after setting up data bits corresponding to the frame SUB and generating link information for linking the file header to the frame SUB. After that, in Step S408, the system controller 1 performs an operation for receiving the PIX signal and stores the PIX signal into the image memory 9 as a transit file which is then transferred to a destination terminal. Then, the system controller 1 ends the procedure of the call receiving operation.

In this way, the facsimile apparatus 100 registers in the identification table 2a the FIF contents of the TSI signal immediately after the SUB signal sent from the calling facsimile machine and regards such FIF contents of the TSI signal as identification information of the calling facsimile machine. Thereby, the facsimile apparatus 100 can easily identify the calling facsimile machine by verifying the FIF contents of the TSI signal with the information stored in the identification table 2a, without applying a special protocol for this verification.

In the selective polling mode, the SEP signal is immediately followed by the CIG signal. Therefore, the facsimile apparatus 100 may include another identification table for the selective polling mode, which prestores the FIF contents of the CIG signals to be generated by the facsimile machines having the common specifications of the option SUP frame. If the FIF contents of the CIG and TSI signals are identical with each other, one identification table can be shared for operations of both option SUB and SEP frames.

Figure 10:
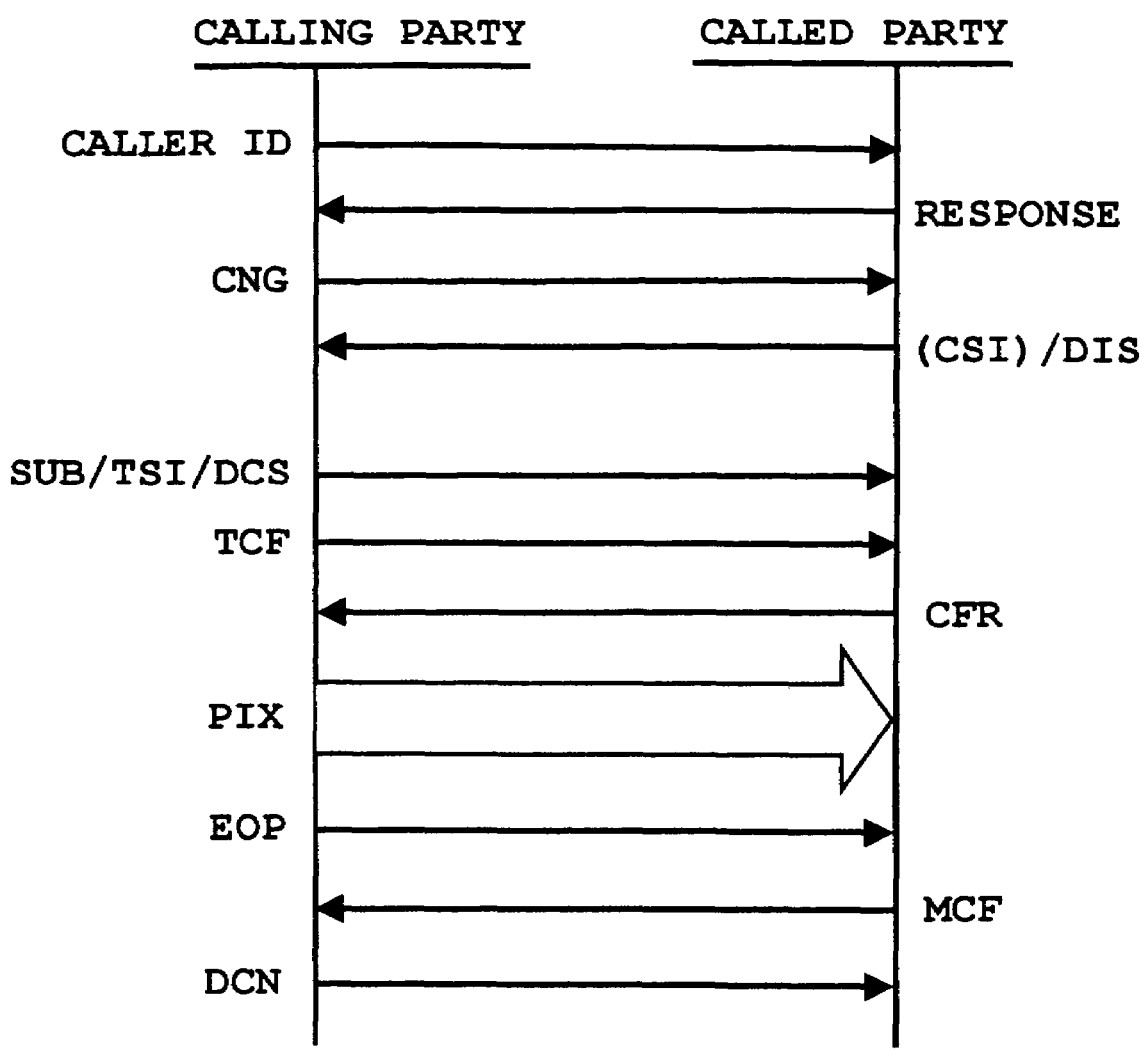
FIG. 10 is an illustration for explaining an exemplary facsimile communications procedure in a normal mode with an optional frame SUB using a telephone number display service.

Next, an exemplary Group-3 facsimile communications procedure using a number display service is explained with reference to FIGS. 10 and 11. The number display service is a function for displaying a telephone number of a calling party on a display of a called party so as to visually inform the called party who is calling. Such a service is provided through the PSTN by a telephone service provider such as the NTT (Nippon Telegram and Telephone Corp.). FIG. 10 shows an exemplary Group-3 facsimile communications procedure for sending a facsimile image from a facsimile terminal to the facsimile apparatus 100 in the normal communications mode with the option frame SUB, using the number display service.

As shown in FIG. 10, a calling party informs a called party of the telephone number thereof as a caller ID before performing the process of establishing a line connection with the called party. Accordingly, the facsimile apparatus 100 can use this caller ID to verify the identification information of the calling facsimile machines for the purpose of security in handling the option frames such as SUB, SEP, PWD, and so on. In this case, the Group-3 facsimile modem 10 may includes a function for recognizing the caller ID as the identification information of the calling facsimile machines. Further, in this case, the identification table 2a may prestore the caller IDs, or the telephone numbers, of the facsimile machines which have the common specifications of the option frames such as SUB, SEP, PWD, and so on.

Figure 11:
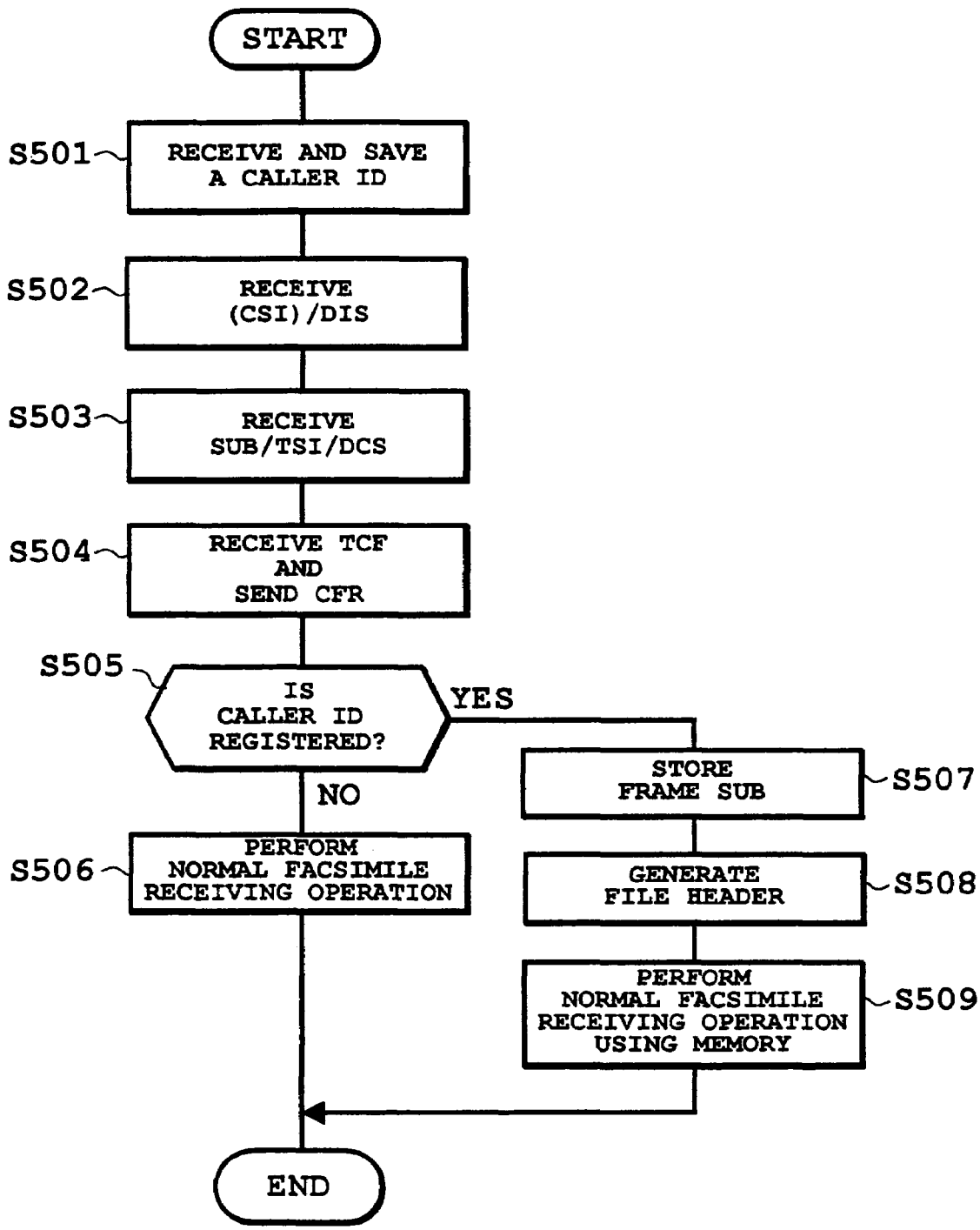
FIG. 11 is a flowchart for explaining an exemplary call receiving operation performed by the facsimile apparatus of FIG. 1, under the telephone number display service.

FIG. 11 is a flowchart of the exemplary Group-3 facsimile communications procedure of FIG. 10. When the facsimile apparatus 100 receives a call ID from the PSTN, it enters a call receiving operation in the Group-3 facsimile communications procedure. In Step S501, the system controller 1 of the facsimile apparatus 100 receives a caller ID (telephone number) from the calling facsimile machine and stores the received caller ID in the system memory 2. Then, the system controller 1 sends (CSI)/DIS to the calling facsimile terminal in Step S502. In Step S503, the facsimile apparatus 100 receives SUB/TSI/DCS. Then, in Step S504, the system controller 1 receives TCF, performs the modem training properly, and sends CFR. Thereby, the modem speed is determined.

The process of Step S505 checks if the received caller ID stored in the system memory 2 is identical to the telephone number registered in the identification table 2a. If the received caller ID is not identical and the check result of Step S505 is NO, the system controller 1 performs the normal facsimile receiving operation in Step S506 and then ends the procedure.

If the received caller ID is identical and the check result of Step S505 is YES, the system controller 1 stores the frame SUB into the system memory 2 in Step S506. Then, in Step S507, the system controller 1 generates a file header after setting up data bits corresponding to the frame SUB and generating link information for linking the file header to the frame SUB. After that, in Step S509, the system controller 1 performs an operation for receiving the PIX signal and stores the PIX signal into the image memory 9 as a transit file which is then transferred to a destination terminal. Then, the system controller 1 ends the procedure of the call receiving operation.

In this way, the facsimile apparatus 100 registers in the identification table 2a the telephone numbers of the facsimile machines which have the common specifications of the option frames such as SUB, SEP, PWD, and so on. Thereby, it becomes easy for the facsimile apparatus 100 to identify the calling facsimile machine by verifying the caller ID, which is the telephone number of the calling facsimile machine, with the information stored in the identification table 2a, with this operation, the facsimile apparatus 100 can identify the calling facsimile machine and properly perform the communications operation even when the calling facsimile machine sends the TSI having no proper information.

Alternatively, the identification table 2a may register a negative list of facsimile machines which do not have the common specifications of the option frames such as SUB, SEP, PWD, and so on.

The embodiment of the present application may be conveniently implemented using a conventional general purpose digital computer programmed according to the teachings of the present specification, as will be apparent to those skilled in the art. Appropriate software coding can readily be prepared based on the teachings of the present disclosure, as will be apparent to those skilled in the art. The present application may also be implemented by the preparation of application specific integrated circuits or by interconnecting an appropriate network of conventional component circuits, as will be readily apparent to those skilled in the art.

This document claims priority rights of and is based on the subject matter described in Japanese Patent Application No. JPAP10-129825 filed on May 13, 1998, the entire contents of which are herein incorporated by reference.

Numerous additional modifications and variations of the present application are possible in light of the above teachings. It is therefore to be understood that within the scope of the appended claims, the present application may be practiced otherwise than as specifically described herein.

I claim:

1. A facsimile communication method for performing a Group 3 facsimile communications operation using an optional frame signal, comprising:

providing a facsimile apparatus with a memory which prestores identification information for a plurality of different facsimile machines having common specifications of optional frames;

receiving a call from a calling facsimile machine for a facsimile communications operation using an optional frame and identification information of said calling facsimile machine, wherein said identification information of said calling facsimile machine identifies said calling facsimile machine;

comparing said identification information of said calling facsimile machine with the identification information prestored in said memory;

canceling performance of the facsimile communications operation using the optional frame and executing standard facsimile operations that do not use the optional frame, when said identification information of said calling facsimile machine does not correspond with the identification information prestored in said memory; and executing the facsimile communications operation using the optional frame when said identification information of said calling facsimile machine corresponds to the identification information prestored in said memory.

2. The method as defined in claim 1, wherein said identification information prestored in said memory comprises subscriber identifications each contained in a frame TSI to be generated by each of said plurality of different facsimile machines and said identification information received in said receiving step is a subscriber identification contained in a frame TSI generated by said calling facsimile machine, said subscriber identification identifying said calling facsimile machine.

3. The method as defined in claim 1, wherein said optional frames include SUB, SEP, and PWD in conformance with the recommendation T-30 of ITU-T.

4. A facsimile communication method for performing a Group 3 facsimile communications operation using optional frame signals in a calling number display service mode, comprising:

providing a facsimile apparatus with a memory which prestores identification information for a plurality of different facsimile machines having common specifications of optional frames;

receiving a telephone number of a calling facsimile machine during a call establishing process in said calling number display service mode and a signal requesting a facsimile communications operation using an optional frame;

verifying said telephone number of said calling facsimile machine received in said receiving step with the identification information prestored in said memory;

canceling performance of the facsimile communications operation using said optional frame and executing standard facsimile operations that do not use the optional frame, when said telephone number of said calling facsimile machine does not correspond with the identification information prestored in said memory; and executing the facsimile communications operation using the optional frame when said telephone number of said calling facsimile machine corresponds to the identification information prestored in said memory, wherein said identification information of said calling facsimile machine identifies said calling facsimile machine.

5. A facsimile apparatus comprising:

memory means for prestoring identification information for a plurality of different facsimile machines having common specifications of optional frames;

modem means for receiving a call from a calling facsimile machine for a facsimile communications operation using an optional frame and identification information of said calling facsimile machine; and controller means for (a) verifying said identification information of said calling facsimile machine with the identification information prestored in said memory, (b) canceling performance of the facsimile communications operation using the optional frame and executing standard facsimile operations that do not use the optional frame, when said identification information of said calling facsimile machine does not correspond with the identification information prestored in said memory, and (c) executing the facsimile communications operation using the optional frame when said identification information of said calling facsimile machine corresponds to the identification information prestored in said memory, wherein said identification information of said calling facsimile machine identifies said calling facsimile machine.

6. A facsimile apparatus, comprising:

memory for prestoring identification information for a plurality of different facsimile machines having common specifications of optional frames;

a modem for receiving a call from a calling facsimile machine for a facsimile communications operation using an optional frame and identification information of said calling facsimile machine; and a controller for (a) verifying said identification information of said calling facsimile machine with the identification information prestored in said memory, (b) canceling performance of the facsimile communications operation using the optional frame and executing standard facsimile operations that do not use the optional frame, when said identification information of said calling facsimile machine does not correspond with the identification information prestored in said memory, and (c) executing the facsimile communications operation using the optional frame when said identification information of said calling facsimile machine corresponds to the identification information prestored in said memory, wherein said identification information of said calling facsimile machine identifies said calling facsimile machine.

7. A facsimile communication method for performing a Group 3 facsimile communications operation using an optional frame signal, comprising:

providing a facsimile apparatus with a memory which prestores identification information for a plurality of different facsimile machines having common specifications of optional frames;

receiving a call from a calling facsimile machine for a facsimile communications operation using an optional frame and identification information of said calling facsimile machine; and verifying said identification information of said calling facsimile machine with the identification information prestored in said memory, wherein said identification information of said calling facsimile machine identifies said calling facsimile machine, and wherein when said identification information of said calling facsimile machine does not correspond with the identification information prestored in said memory, standard facsimile operations that do not use the optional frame are performed while facsimile operations that would use the optional fame are canceled.

8. The facsimile apparatus as recited in claim 5, wherein said memory means stores a table of identification information identifying facsimile machines capable of operating with optional frames.

9. The facsimile apparatus as recited in claim 6, wherein said memory stores a table of identification information identifying facsimile machines capable of operating with optional frames.

10. A method for performing a facsimile communications operation using an optional frame signal, comprising:

providing an apparatus with a memory which prestores identification information for a plurality of different facsimile machines having common specifications of optional frames;

receiving a call from a calling facsimile machine for a facsimile communications operation using an optional frame and identification information of said calling facsimile machine;

verifying said identification information of said calling facsimile machine with the identification information prestored in said memory;

canceling performance of the facsimile communications operation using the optional frame and executing standard facsimile operations that do not use the optional frame, when said identification information of said calling facsimile machine does not correspond with the identification information prestored in said memory; and executing the facsimile communications operation using the optional frame when said identification information of said calling facsimile machine corresponds to the identification information prestored in said memory, wherein said identification information of said calling facsimile machine identifies said calling facsimile machine.

11. A method for performing a facsimile communications operation using optional frame signals in a calling number display service mode, comprising:

providing an apparatus with a memory which prestores identification information for a plurality of different facsimile machines having common specifications of optional frames;

receiving a telephone number of a calling facsimile machine during a call establishing process in said calling number display service mode and a signal requesting a facsimile communications operation using an optional frame;

verifying said telephone number of said calling facsimile machine received in said receiving step with the identification information prestored in said memory;

canceling performance of the facsimile communications operation using said optional frame and executing standard facsimile operations that do not use the optional frame, when said telephone number of said calling facsimile machine does not correspond with the identification information prestored in said memory; and executing the facsimile communication operation using the optional frame when said telephone number of said calling facsimile machine corresponds to the identification information prestored in said memory, wherein said identification information of said calling facsimile machine identifies said calling facsimile machine.

12. A facsimile apparatus comprising:

memory configured to prestore identification information for a plurality of different facsimile machines having common specifications of optional frames;

a modem configured to receive a call from a calling facsimile machine, said received call including a telephone number of the calling facsimile machine during a call establishing process in said calling number display service mode and a signal requesting a facsimile communications operation using an optional frame; and a controller configured to (a) compare said telephone number of said calling facsimile machine with the identification information prestored in said memory, (b) cancel performance of the facsimile communications operation using the optional frame and executing standard facsimile operations that do not use the optional frame, when said telephone number of said calling facsimile machine does not correspond with the identification information prestored in said memory, and (c) execute the facsimile communications operation using the optional frame when said telephone number of said calling facsimile machine corresponds to the identification information prestored in said memory.

13. A facsimile apparatus as recited in claim 12, wherein said memory stores a table of identification information identifying facsimile machines capable of operating with optional frames.

* * * * *